(12) United States Patent
D'Souza et al.

(10) Patent No.: US 11,394,819 B2
(45) Date of Patent: Jul. 19, 2022

(54) CONTROL OF A USER DEVICE UNDER WET CONDITIONS

(71) Applicant: QUALCOMM Incorporated, San Diego, CA (US)

(72) Inventors: Sandeep Louis D'Souza, San Diego, CA (US); Vadim Winebrand, San Diego, CA (US); Mohamed Ahmed, San Marcos, CA (US); Syed Fawad Ahmad, San Diego, CA (US); Nathan Felix Altman, San Diego, CA (US); Suhail Jalil, Poway, CA (US); Livingstone Song, San Diego, CA (US); Raj Kumar, San Diego, CA (US); David Chandler, San Diego, CA (US); Masoud Roham, San Diego, CA (US); Xin Fan, Irvine, CA (US); Lennart Karl-Axel Mathe, San Diego, CA (US); Kostadin Dimitrov Djordjev, Los Gatos, CA (US); Deep Bhatia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/741,571

(22) Filed: Jan. 13, 2020

(65) Prior Publication Data

US 2021/0067623 A1  Mar. 4, 2021

Related U.S. Application Data

(60) Provisional application No. 62/895,955, filed on Sep. 4, 2019.

(51) Int. Cl.
*H04M 1/72448* (2021.01)

(52) U.S. Cl.
CPC .... *H04M 1/72448* (2021.01); *H04M 2250/12* (2013.01)

(58) Field of Classification Search
CPC ......... H04M 1/72563; H04M 1/72454; H04M 2250/12; H04M 1/02; G06F 1/1643;
(Continued)

(56) References Cited

U.S. PATENT DOCUMENTS 11,059,550 B2 * 7/2021 Sepänniitty ............. B63C 11/26
2007/0247434 A1 * 10/2007 Cradick .............. G06F 3/04142
345/173
(Continued)

FOREIGN PATENT DOCUMENTS

WO   WO-0131788 A1 * 5/2001 ........... G06F 1/1616
WO   2018131932 A1   7/2018

OTHER PUBLICATIONS

International Search Report and Written Opinion—PCT/US2020/040149—ISAEPO—dated Oct. 9, 2020.

*Primary Examiner* — Matthew C Sams
(74) *Attorney, Agent, or Firm* — Qualcomm Incorporated

(57) ABSTRACT

Various aspects of the present disclosure generally relate to control of a user device under a wet condition. In some aspects, a user device may determine whether the user device is operating under a wet condition; select, based at least in part on whether the user device is operating under the wet condition, a set of input components to control the user device, wherein the set of input components is selected from a plurality of different sets of input components; and configure a user interface of the user device according to the set of input components. Numerous other aspects are provided.

30 Claims, 11 Drawing Sheets

(58) Field of Classification Search
CPC .... G06F 3/044; G06F 3/0416; G06F 3/03545; G06F 3/04186; G06F 3/0418; G06F 1/1626; G06F 1/3206; G06F 1/3231; G06F 2203/04106; G06F 3/042; G08B 21/20; G06K 7/10366; G06K 19/0717; H04W 52/0254
See application file for complete search history.

(56) References Cited

U.S. PATENT DOCUMENTS

| | | | |
|---|---|---|---|
| 2015/0022481 A1* | 1/2015 | Andersson | G06F 3/044 |
| | | | 345/174 |
| 2016/0146935 A1* | 5/2016 | Lee | G01D 21/00 |
| | | | 367/87 |
| 2016/0259448 A1* | 9/2016 | Guarneri | G06F 3/044 |
| 2017/0063851 A1* | 3/2017 | Kim | H04W 12/065 |
| 2018/0190102 A1* | 7/2018 | Lui | G08B 21/20 |
| 2018/0196982 A1* | 7/2018 | Panchawagh | G06V 40/1353 |
| 2019/0064998 A1* | 2/2019 | Chowdhury | G06F 3/0412 |
| 2019/0268463 A1* | 8/2019 | Lu | G06F 1/3206 |
| 2019/0324640 A1* | 10/2019 | Park | G06F 3/0482 |
| 2020/0064952 A1* | 2/2020 | Gupta | G01L 1/142 |
| 2020/0104021 A1* | 4/2020 | Bylenok | G06F 3/02 |

\* cited by examiner

CONTROL OF A USER DEVICE UNDER WET CONDITIONS

RELATED APPLICATION

This application claims priority under 35 U.S.C. § 119 to U.S. Provisional Patent Application No. 62/895,955, filed on Sep. 4, 2019, the content of which is incorporated by reference herein in its entirety.

FIELD OF THE DISCLOSURE

Aspects of the present disclosure generally relate to control of a user device and to control of a user device under wet conditions.

BACKGROUND

A user device may include a touchscreen as an input and output device. A user can provide inputs and/or control information through touching the screen and/or view information displayed via the touchscreen. The touchscreen may be a capacitive touchscreen that detects touches of the user through changes in capacitance detected by capacitive sensors of the touchscreen. Further, the user device may include a fingerprint scanner to obtain an image of a fingerprint of the user to authenticate the user to permit the user to unlock the user device.

SUMMARY

In some aspects, a method may include determining, by a user device, whether the user device is operating under a wet condition; selecting, by the user device and based at least in part on whether the user device is operating under the wet condition, a set of input components to control the user device, wherein the set of input components is selected from a plurality of different sets of input components; and configuring, by the user device, a user interface of the user device according to the set of input components.

In some aspects, a user device may include a user interface that includes an ultrasonic sensor and a fingerprint scanner; one or more memories; and one or more processors, the one or more memories and the one or more processors configured to: determine whether the user device is potentially operating under a wet condition; configure, based at least in part on whether the user device is potentially operating under the wet condition, the ultrasonic sensor to receive an ultrasonic measurement to detect when a user is attempting to unlock the user device; and cause, based at least in part on receiving the ultrasonic measurement indicating that the user is attempting to unlock the user device, the fingerprint scanner to enable an authentication process to be performed based at least in part on a scan of a finger of the user.

In some aspects, a non-transitory computer-readable medium may store one or more instructions. The one or more instructions, when executed by one or more processors of a user device, may cause the one or more processors to: determine that the user device is operating under a wet condition; select, based at least in part on the user device operating under the wet condition, a set of input components to control the user device, wherein the set of input components are selected from a plurality of different sets of input components of the user device; and configure a user interface of the user device to operate in accordance with inputs from the set of input components.

In some aspects, an apparatus may include means for determining whether a user device is operating under a wet condition; means for configuring, when the user device is determined to be operating under the wet condition, a user interface of the user device to be controlled using first information from a first set of input components; and means for configuring, when the user device is determined to not be operating under the wet condition, the user interface to be controlled using second information from a second set of input components that is different from the first set of input components.

Aspects generally include a method, apparatus, system, computer program product, non-transitory computer-readable medium, user device, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
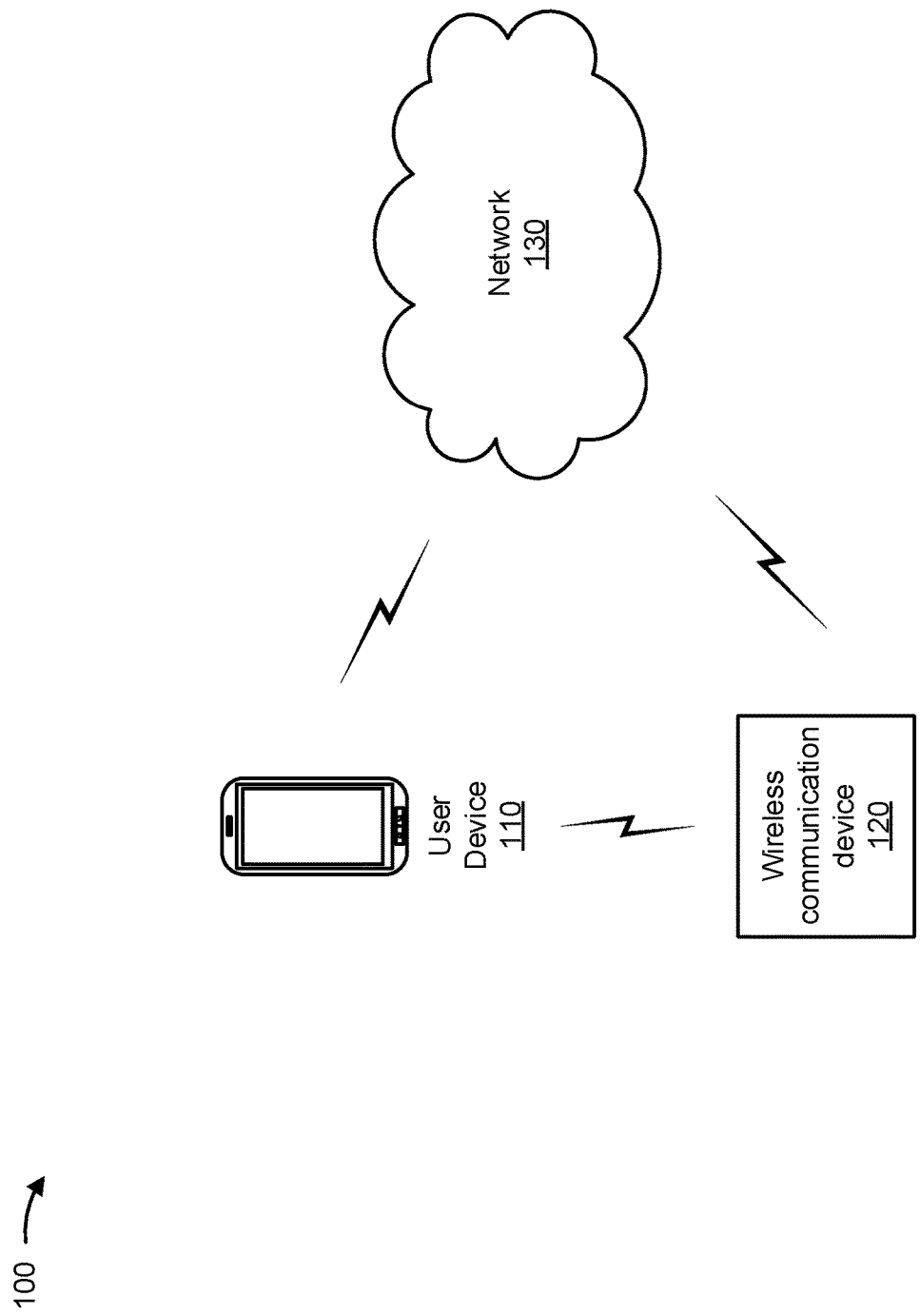
FIG. 1 is a diagram conceptually illustrating an example system in which devices and/or methods described herein may be implemented, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In many instances, a user device (e.g., a user equipment, a smartphone, a tablet computer, and/or the like) may utilize a capacitive touch sensor to detect a user attempting to unlock the user device. For example, the capacitive touch sensor may be associated with a touchscreen and/or another user interface (e.g., a button) of the user device. The capacitive touch sensor may provide a measurement and/or information that can be analyzed to detect and/or identify a finger of a user. The capacitive touch sensor may be associated with a fingerprint scanner (e.g., and optical fingerprint scanner) that is configured to obtain an image of a detected fingerprint of the user. The detected fingerprint can then be used to verify the user and/or unlock the user device.

However, such capacitive touch sensors may be ineffective when the user's finger is wet (e.g., includes droplets of water, sweat, or other liquids) and/or when the user device (or at least the capacitive touch sensor of the user device) is submerged in a liquid (e.g., underwater) due to the presence of the liquid affecting the measured capacitance of the capacitive touch sensor. Some previous techniques may include a force sensor to detect an amount of force of a user's touch to detect the user. Including such a force sensor within a user device adds costs to the user device, requires an increased thickness of the user device (which can be undesirable), and increases complexity of designing the user device due to the force sensors occupying valuable real estate within a limited housing space of the user device.

Furthermore, the user device may include a camera that the user may want to use underwater (or under any other type of liquid). However, in order to access the camera, the user may have to unlock the user device and/or provide a user input via the capacitive touch sensor of the user device. Furthermore, in order to control the camera (e.g., to capture an image, a video, and/or the like), the user may have to utilize the capacitive touch sensor (e.g., one or more user interface elements of a touchscreen) to control the camera. Accordingly, in view of the above, the user may be unable to access and/or control the camera while the user device is underwater without first unlocking the user device above water (and keeping the user device unlocked) and/or configuring controls of the camera while above water.

However, such actions may not be possible (e.g., because the user device is taken underwater without the actions being performed) and/or may be ineffective (e.g., because the user device may become locked underwater after the user device is idle for a period of time), which correspondingly degrades a user experience associated with using the user device underwater. Similar to accessing and/or controlling a camera as described above, the user may want to use and/or control other features or components of the user device underwater that involve using a capacitive touch sensor. For example, the user may want to activate a light emitting diode (LED) to serve as a spotlight or flashlight, adjust the touchscreen (e.g., a brightness of a display of the touchscreen, a sensitivity of the touchscreen, and/or the like) of the user device (and/or another type of display of the user device), adjust a speaker setting (e.g., a volume of the speaker, a mute setting of the speaker, and/or the like), and/or control any other type of function of the user device.

Some aspects described herein enable a user to unlock and/or control a user device under wet conditions. As used herein, the user device being in a wet condition and/or operating in a wet condition may correspond to the user device being submerged in a liquid, receiving a user input from a user with a wet finger (or other body part), and/or the like. In some aspects, a user device may include an ultrasonic sensor for user detection (e.g., that is capable of detecting a user's finger). The ultrasonic sensor be configured to operate as a passive sensor (e.g., that uses piezoelectric properties of the ultrasonic sensor to detect the user via detected vibrations corresponding to user inputs and/or user interactions with the user device) and/or as an active sensor (e.g., that transmits ultrasonic signals and analyzes reflected ultrasonic signals to detect a user).

Furthermore, in some aspects, the user device may automatically select which input components (and/or configurations of input components) of the user device are to be used to unlock and/or receive a user input to control the user device (and/or a component or function of the user device, such as a camera, an LED, a display, and/or the like). For example, the user device may determine whether the user device is underwater. In such a case, if the user device is determined to be operating under a wet condition (e.g., using a pressure sensor, a liquid sensor or hydrometer, a gas sensor, and/or the like), the user device may use the ultrasonic sensor to detect the user (e.g., detect a touch of the user) to unlock the user device and/or receive a user input to control the user device. On the other hand, if the user device is determined to not be operating under a wet condition, the user device may use a capacitive touch sensor to unlock and/or receive a user input to control the user device.

In this way, a user device is provided that can include one or more sensors and/or components to permit a user to unlock and/or control a user device under wet conditions. Accordingly, a user device, as described herein, may reduce consumption of computing resources of a user device relative to previous techniques (e.g., resources attempting to use a capacitive touch sensor to detect a user's finger under wet conditions) and improve a user experience of using the user device under wet conditions. Furthermore, a user interface of a user device, as described herein, may not require use of a force sensor to detect a user, thus reducing costs and/or complexity of previous user devices that utilize a force sensor to detect a finger of a user.

FIG. 1 is a diagram conceptually illustrating an example system 100 in which devices and/or methods described herein may be implemented, in accordance with various aspects of the present disclosure. As shown in FIG. 1, system 100 may include a user device 110, a wireless communication device 120, and/or a network 130. Devices of system 100 may interconnect via wired connections, wireless connections, or a combination of wired and wireless connections.

User device 110 includes one or more devices capable of including one or more input components associated with a user interface to enable control of user device 110 under wet conditions, as described herein. For example, user device 110 may include one or more devices capable of receiving, generating, storing, processing, and/or providing information associated with one or more sensors (e.g., capacitive touch sensors, accelerometers, piezoelectric sensors, ultrasonic sensors, and/or the like) for detecting a user described herein. More specifically, user device 110 may include a communication and/or computing device that includes a capacitive touch interface (e.g., a touchscreen, a capacitive touch button, and/or the like), such as a user equipment (e.g., a smartphone, a radiotelephone, and/or the like), a laptop computer, a tablet computer, a handheld computer, a wearable communication device (e.g., a smart wristwatch, a pair of smart eyeglasses, and/or the like), a home security system (e.g., with a touch controlled security panel), a home appliance, a vehicle (e.g., which capacitive touch controlled doors, consoles, and/or the like), a payment terminal, an Internet of Things (IoT) device, or any other similar type of device. As described herein, user device 110 (and/or a user detection module of user device 110) may be used to detect, analyze, and/or perform one or more operations associated with detecting whether user device 110 is operating under a wet condition, detecting a user and/or a user input in the wet condition, and/or performing an action associated with detecting the user and/or user input, as described herein.

Similar to user device 110, wireless communication device 120 includes one or more devices capable of receiving, generating, storing, processing, and/or providing information associated with a user input and/or user interaction described herein. For example, wireless communication device 120 may include a base station, an access point, and/or the like. Additionally, or alternatively, similar to user device 110, wireless communication device 120 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Network 130 includes one or more wired and/or wireless networks. For example, network 130 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some aspects, network 130 may include a data network and/or be communicatively with a data platform (e.g., a web-platform, a cloud-based platform, a non-cloud-based platform, and/or the like) that is capable of receiving, generating, processing, and/or providing information associated with a user input and/or user interaction detected and/or analyzed by user device 110.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
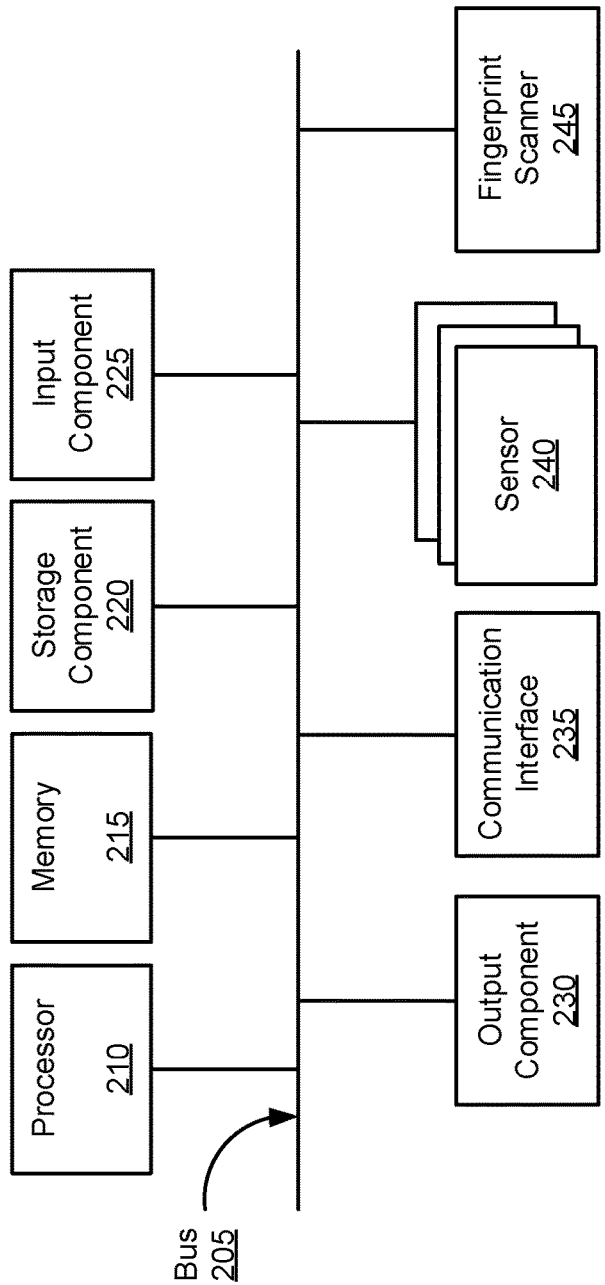
FIG. 2 is a diagram conceptually illustrating example components of one or more devices shown in FIG. 1, such as a user device, in accordance with various aspects of the present disclosure.

FIG. 2 is a diagram of example components of a device 200. Device 200 may correspond to user device 110 and/or wireless communication device 120. Additionally, or alternatively, user device 110, and/or wireless communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, one or more sensors 240 (referred to individually as a "sensor 240" and collectively as "sensors 240"), and a fingerprint scanner 245.

Bus 205 includes a component that permits communication among the components of device 200. Processor 210 includes a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), and/or another type of processing component. Processor 210 is implemented in hardware, firmware, or a combination of hardware and software. In some aspects, processor 210 includes one or more processors capable of being programmed to perform a function.

Memory 215 includes a random-access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input. For example, input component 225 may be associated with a user interface as described herein (e.g., to permit a user to interact with the one or more features of device 200). Input component 225 includes a capacitive touchscreen display that can receive user inputs. Input component 225 may include a keyboard, a keypad, a mouse, a button, a switch, a microphone, and/or the like. Additionally, or alternatively, input component 225 may include a sensor for sensing information (e.g., a vision sensor, a location sensor, an accelerometer, a gyroscope, an actuator, and/or the like). In some aspects, input component 225 may include a camera (e.g., a high-resolution camera, a low-resolution camera, and/or the like). In some aspects, input component 225 may include correspond to, and/or be associated with one or more of sensors 240. As described herein, a configuration of input component 225 may be selected according to whether device 200 (e.g., as user device 110) is operating under (or in) a wet condition. Output component 230 includes a component that provides output from device 200 (e.g., a display, a speaker, one or more light-emitting diodes (LEDs), and/or the like).

Communication interface 235 includes a transceiver and/ or a separate receiver and transmitter that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency (RF) interface, a universal serial bus (USB) interface, a Wi-Fi interface, a cellular network interface, a wireless modem, an inter-integrated circuit ($I^2C$), a serial peripheral interface (SPI), or the like.

Sensor 240 includes one or more devices capable of sensing characteristics associated with device 200 (e.g., characteristic of a physical environment or operating condition of device 200). Sensor 240 may include one or more integrated circuits (e.g., on a packaged silicon die) and/or one or more passive components of one or more flex circuits to enable communication with one or more components of device 200.

Sensor 240 may include a vision sensor (e.g., an image sensor, an optical sensor, a camera, and/or the like) that has a field of view from which sensor 240 may obtain an image (e.g., an image of a fingerprint). Additionally, or alternatively, sensor 240 may include a hydrometer (e.g., to detect the presence or density of a liquid in an environment of device 200), a magnetometer (e.g., a Hall effect sensor, an anisotropic magnetoresistive (AMR) sensor, a giant magneto-resistive sensor (GMR), and/or the like), a location sensor (e.g., a global positioning system (GPS) receiver, a local positioning system (LPS) device (e.g., that uses triangulation, multi-lateration, and/or the like), and/or the like), a gyroscope (e.g., a micro-electro-mechanical systems (MEMS) gyroscope or a similar type of device), an accelerometer, a speed sensor, a motion sensor, an infrared sensor, a temperature sensor, a pressure sensor, a gas sensor, and/or the like.

Sensor 240 may include an ultrasonic sensor to detect the presence of a user and/or be used in association with ultrasonic fingerprint detection. In some aspects, the ultrasonic sensor may be used by fingerprint scanner 245 to obtain an ultrasonic measurement of a fingerprint of a user. As described herein, an ultrasonic sensor, as a passive sensor, may detect and/or analyze vibrations from a user that can be used to passively detect the user based at least in part on piezoelectric properties of the ultrasonic sensor (e.g., without transmitting an ultrasonic signal). An ultrasonic sensor, as an active ultrasonic sensor, may transmit an ultrasonic signal and receive a corresponding reflected ultrasonic signal that can be measured to determine whether the user's finger is on (or near) the user device, a touchscreen of the user device, and/or a fingerprint scanner of the user device.

Fingerprint scanner 245 includes one or more devices capable of analyzing a fingerprint of a user. Fingerprint scanner 245 may be associated with and/or communicatively coupled with one or more of sensors 240. Fingerprint scanner 245 may include and/or be associated with an optical sensor, a capacitive touch sensor, an ultrasonic sensor, a thermal sensor, and/or the like. Fingerprint scanner 245 may be configured, using any suitable technique, as a user authentication device to analyze a fingerprint of a user to determine whether the user is an authorized user of device 200 and/or an application associated with device 200. Accordingly, as an authentication device, fingerprint scanner 245 may, based at least in part on identifying a fingerprint of an authorized user, may permit an unlock operation of the user device to be performed (e.g., to access an application of the user device, to access a home screen of the user device, to log in to an account associated with the user, and/or the like).

Device 200 may perform one or more processes described herein. Device 200 may perform these processes in response to processor 210 executing software instructions stored by a non-transitory computer-readable medium, such as memory 215 and/or storage component 220. "Computer-readable medium" as used herein refers to a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, the means for performing the processes and/or operations described herein may include bus 205, processor 210, memory 215, storage component 220, input component 225, output component 230, communication interface 235, sensor 240, and/or any combination thereof.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
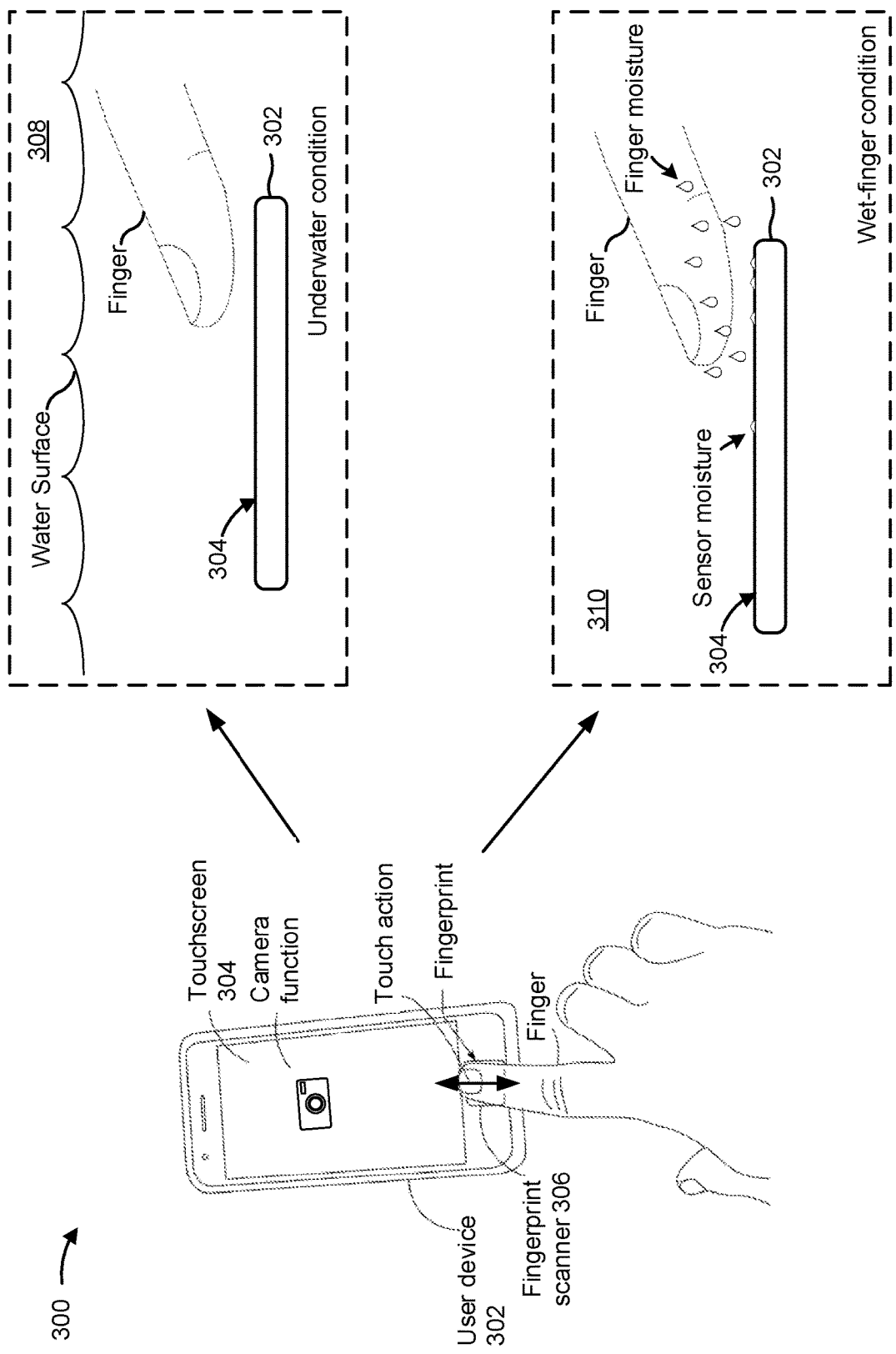
FIGS. 3A, 3B and 4-6 are diagrams conceptually illustrating one or more examples associated with controlling a user device under wet conditions in accordance with various aspects of the present disclosure.
Figure 3B:
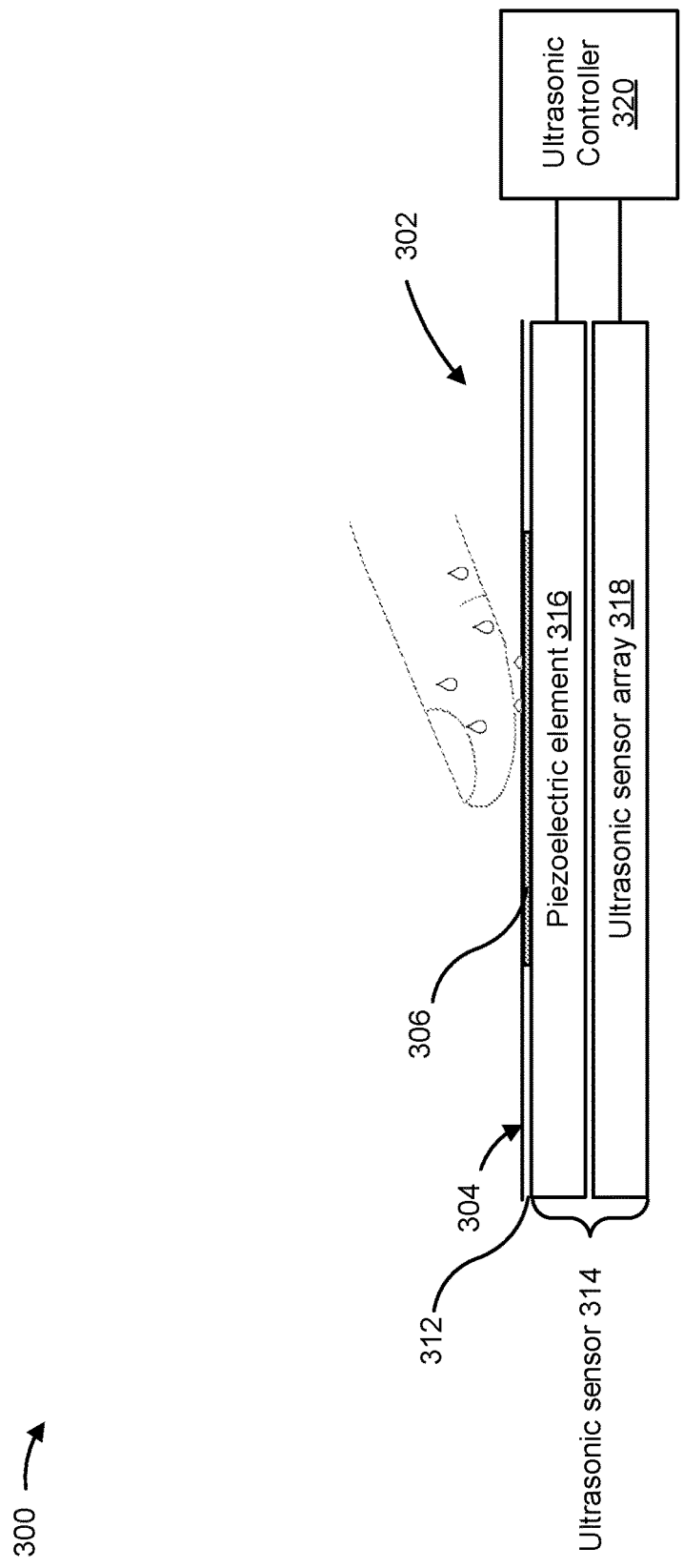

FIGS. 3A and 3B are diagrams conceptually illustrating an example 300 associated with control of a user device 302 under wet conditions in accordance with various aspects of the present disclosure. In example 300, user device 302 (which may correspond to user device 110 of FIG. 1) includes a touchscreen 304 (e.g., that includes an array of capacitive touch sensors) and a fingerprint scanner 306 that utilizes information from the touchscreen to detect a finger of a user and/or analyze a fingerprint of the user. For example, as shown in FIG. 3A, through a touch action of the user (represented by a hand of the user and/or finger of the user in FIGS. 3A and 3B) may provide a user input by touching or pressing the finger of the user on the touchscreen (e.g., to select a camera function under dry conditions) and/or fingerprint scanner (e.g., to permit the user device to authenticate the user) that can be detected and/or in accordance with various aspects of this disclosure. While user device 302 is shown as a smartphone in example 300, some aspects described herein may similarly apply to other types of devices (e.g., one or more of the example devices described above in connection with user device 110) that include and/or utilize user touch detection.

As shown in example 300, a user may be operating (e.g., performing the touch action) the user device under one or more wet conditions. For example, as shown by reference number 308, the user may operate the user device under water (referred to herein as "underwater condition 308").

More specifically, the user may operate the user device while swimming with the user device, while using the user device to capture underwater images, and/or the like. As another example, as shown by reference number 310, the user may be operating the user device with a wet finger (referred to herein as "wet-finger condition 310"), which may cause sensor moisture on touchscreen 304. The finger and/or sensor may be considered wet when moisture (e.g., droplets of water, sweat, and/or other liquids) is present on the finger and/or the sensor.

Under the wet conditions 308, 310 illustrated in example 300, user device 302 may be unable to accurately detect a user input via capacitive touch sensors of the touchscreen 304 and/or fingerprint scanner 306 because physical properties of the water and/or moisture distort and/or affect the capacitance that can be measured from the user's finger (e.g., due to physical properties of the water and/or moisture having a level of capacitance). Accordingly, the user device, in example 300 may be incapable of using the capacitive touch sensors of the user device to detect the user's touch action and/or, correspondingly, to accurately determine a user input associated with a user's touch on the touchscreen and/or fingerprint scanner.

As shown in FIG. 3B, a cross-sectional view of user device 302 shows that user device 302 includes a capacitive touch sensor layer 312. As shown, fingerprint scanner 306 may be positioned within and/or be adjacent to capacitive touch sensor layer 312. Capacitive touch sensor layer 312 may include a plurality of electrodes (e.g., capacitive sense electrodes, capacitive micromachined ultrasonic sensors (CMUTs), and/or the like) for detecting finger position, finger proximity, and/or the like relative to a perimeter of touchscreen 304.

As further shown in FIG. 3B, user device 302 may include an ultrasonic sensor 314 that includes a piezoelectric element 316 and an ultrasonic sensor array 318. Piezoelectric element 316 may include any suitable piezoelectric material (e.g., a copolymer) that has piezoelectric properties to detect vibrations associated with a user touching (or tapping) user device 302. More specifically, piezoelectric element 316 may include ferroelectric polymers such as polyvinylidene fluoride (PVDF) and polyvinylidene fluoride-trifluoroethylene (PVDF-TrFE) copolymers, polyvinylidene chloride (PVDC) homopolymers and copolymers, polytetrafluoroethylene (PTFE) homopolymers and copolymers, and diisopropylam-monium bromide (DIPAB).

Piezoelectric element 316 may serve as an ultrasonic transmitter that transmits ultrasonic signals to actively detect that the user is touching touchscreen 304 and/or fingerprint scanner 306. Ultrasonic sensor array 318 may include one or more sensing elements and/or associated electronics (e.g., within a thin film transistor (TFT)) that are capable of detecting and/or receiving reflected ultrasound signals associated with transmitted ultrasound signals from piezoelectric element 316. According to some implementations, ultrasonic sensory array 318 may be communicatively coupled and/or associated with sensing elements of fingerprint scanner 306 to enable detection and/or location of the finger relative to a perimeter of fingerprint scanner 306.

As described herein, based at least in part on the user device 302 operating under a wet condition, ultrasonic sensor 314 may be utilized to permit the user to perform an operation associated with user device 302. For example, an ultrasonic controller 320, based at least in part on determining and/or receiving instructions indicating the user device 302 is operating under a wet condition, may configure ultrasonic sensor 314 to monitor for and/or detect a user's finger, determine a position of a user's finger, and/or determine a user input based at least in part on one or more user interactions (e.g., one or more touch actions or taps) with the user's finger.

As indicated above, FIGS. 3A and 3B are provided merely as one or more examples. Other examples may differ from what is described with regard to FIGS. 3A and 3B.

Figure 4:
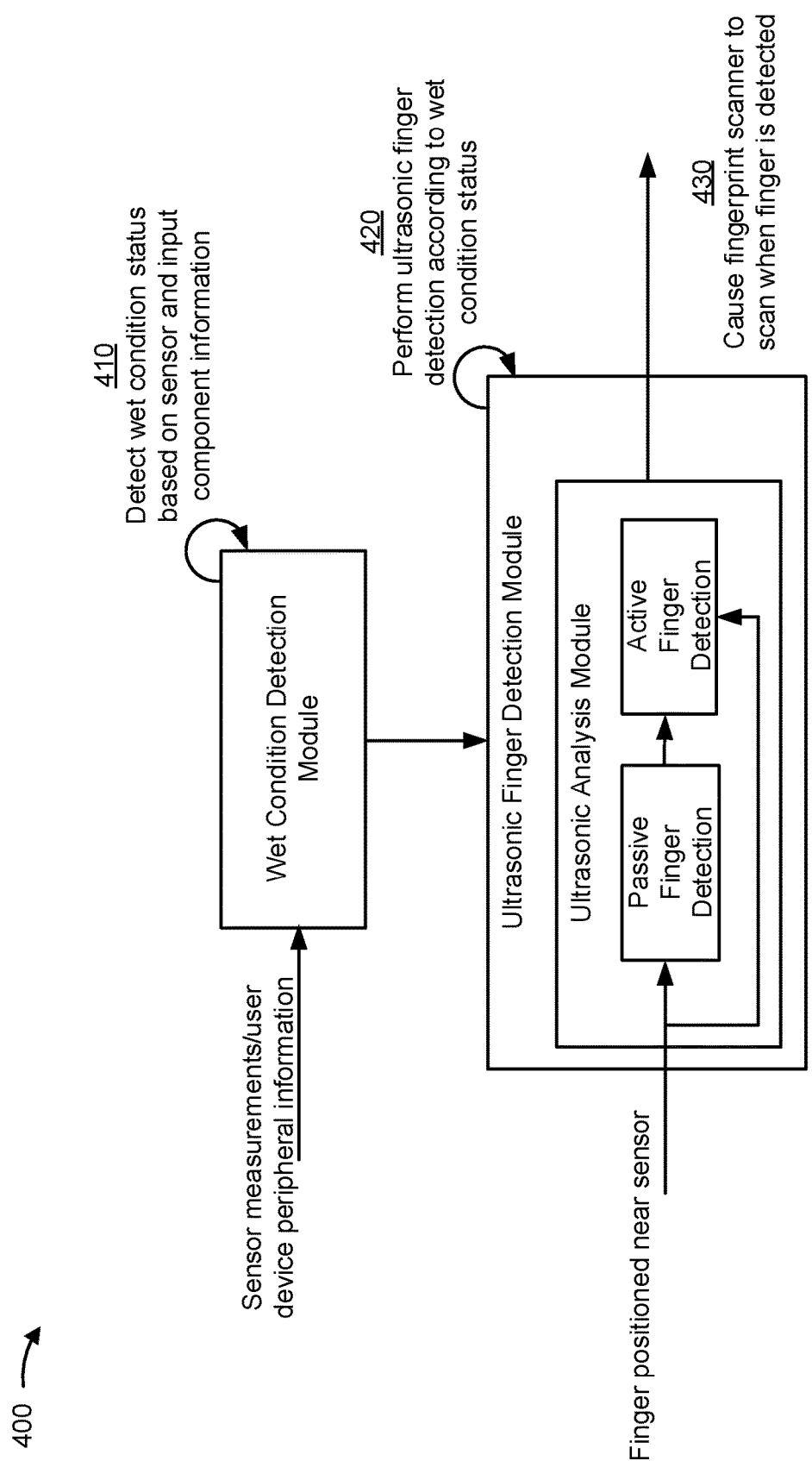

FIG. 4 is a diagram conceptually illustrating an example 400 associated with controlling a user device under wet conditions in accordance with various aspects of the present disclosure. In FIG. 4, a user interface of a user device may be configured to detect a user (or a finger of a user) using a wet condition detection module and/or an ultrasonic finger detection module. The wet condition detection module and/or ultrasonic finger detection module may be modules associated with and/or included within ultrasonic controller 320 of FIG. 3.

As shown in FIG. 4, and by reference number 410, the wet condition detection module detects a wet condition status based at least in part on sensor information and input component information. For example, the wet condition detection module may determine whether the user device (e.g., user device 110 and/or user device 302) is operating under a wet condition, potentially operating under a wet condition, or is not operating under a wet condition.

In some aspects, the wet condition detection module may determine that the user device is operating a under a wet condition based at least in part on a liquid density measurement of a hydrometer of the user device. For example, if the liquid density measurement satisfies a threshold indicating that the user device is underwater and/or is being exposed to moisture (e.g., from a wet finger of a user), the wet condition detection module may indicate to the ultrasonic finger detection module that the user device is operating under a wet condition.

Additionally, or alternatively, the wet condition detection module may determine that the user device is operating under a wet condition based at least in part on capacitive touch sensors of the touchscreen measuring a capacitance that is outside of a threshold difference of a baseline capacitance (e.g., a capacitance corresponding to the user device operating under a dry condition). Furthermore, the wet condition detection module may determine whether the user device is operating in an underwater condition or a wet-finger condition based at least in part on a quantity of the capacitive touch sensors that detect the threshold difference. For example, if more than a threshold percentage (e.g., more than 25%, more than 50%, more than 80%, and/or the like) of the capacitive touch sensors indicate a capacitance that is outside of a threshold distance from the baseline capacitance, the wet condition detection module may determine that the user device is operating in an underwater condition, and if the less the threshold percentage of the capacitive touch sensors indicate a capacitance that is outside of the threshold difference from the baseline capacitance, the wet condition detection module may determine that the user device is operating under a wet-finger condition. However, if the capacitive touch sensors of the touchscreen indicate a capacitance that is within a threshold difference of the baseline capacitance (e.g., while the user device is being handled by the user as determined from motion detection of an accelerometer), the wet condition detection module may determine that the user device is not operating under a wet condition.

According to some aspects, the wet condition detection module may determine that the user device is not operating under one or more wet conditions based at least in part on an operating condition of the user device. For example, if the user device is communicatively coupled to a peripheral (e.g., an input component and/or power source) via a communication interface (e.g., a universal serial bus (USB)), the wet condition detection module may determine that the user device is not operating under a wet condition and/or a particular wet condition (e.g., a user device communicatively coupled with a power source to charge a battery of the user device is likely not under water).

As shown by reference number 420 of FIG. 4, the ultrasonic finger detection module is to perform ultrasonic finger detection according to the wet condition status received from the wet condition detection module. As shown, the ultrasonic finger detection module may utilize an ultrasonic analysis module that is to perform passive finger detection and/or active finger detection. Passive finger detection may be performed, as described herein, based at least in part on receiving passive acoustic measurements from an ultrasonic sensor (e.g., measurements associated with piezoelectric element 316) that indicate vibrations of the user device and/or other components of the user device that represent a finger touching or tapping the user device. Such vibrations may be represented in a reference mapping of acoustic measurements that represent particular user interactions (e.g., taps, presses, shakes, and/or the like) of the user device under certain conditions (e.g., under wet conditions, under dry conditions, and/or the like). Using the reference mapping and the passive acoustic measurements of the ultrasonic sensor, the ultrasonic analysis module may passively detect that a user's finger is interacting with the user device.

As described herein, active finger detection may be performed by causing the ultrasonic sensor to transmit (e.g., using piezoelectric element 316) ultrasonic signals and analyze reflected ultrasonic signals (e.g., received by ultrasonic sensor array 318) to determine, according to an analysis of the reflected ultrasonic signals, whether a finger is touching the touchscreen and/or fingerprint scanner of the user device. The active ultrasonic analysis may include any suitable technique that is based at least in part on a difference between the transmitted ultrasonic signal and the received reflected acoustic signal. For example, a presence of reflected ultrasonic signals and/or spatial variations in the reflected ultrasonic signals may indicate the presence of a finger of the user, a distance between the finger and the ultrasonic sensor, and/or the like. On the contrary, an absence of reflected ultrasonic signals and/or variations in the reflected signal may indicate that no finger is present.

In some aspects, because active finger detection may consume more resources of the user device (e.g., processing resources, memory resources, and/or power resources associated with transmitting an ultrasonic signal and/or processing a received reflected ultrasonic signal), the ultrasonic analysis module may use passive finger detection to trigger when to perform active finger detection (so that an active finger detection is not being performed when the user does not have a finger on the fingerprint scanner or other part of the user device). For example, the reference mapping may include a reference passive acoustic measurement that corresponds to the user tapping and/or touching the fingerprint scanner (e.g., an action that corresponds to a user input to unlock the user device). In such a case, when a passive acoustic measurement is received that matches (e.g., within a threshold) that reference passive acoustic measurement, the ultrasonic analysis module may detect that the user is likely attempting to unlock the user device.

Additionally, or alternatively, under certain conditions, passive finger detection may be bypassed (e.g., to conserve processing resources, memory resources, and/or power resources and/or to have increased signal quality or signal-integrity as quantified by signal to noise ratio, for better detection) according to the wet condition status and/or other operating condition of the user device. For example, passive finger detection may be bypassed when a display of the touchscreen is activated (e.g., indicating that the user recently interacted with the user device), when the user device is being activated or initially powered on, when the user device is connected to a power source, and/or the like. In this way, based at least in part on the wet condition status and/or operating condition of the user device, the ultrasonic analysis module may bypass passive finger detection when the passive finger detection is unlikely to indicate the presence of a user's finger (e.g., because the user is not likely to be tapping of the user device, because the user has indicated an interaction with the user device that did not involve a tapping of the user device) and/or when power resources of the user device do not need to be conserved (e.g., because the user device is being charged via a power source).

As shown by reference number 430 of FIG. 4, when the ultrasonic analysis module (e.g., using passive finger detection and/or active finger detection) detects that the user has positioned a finger over the fingerprint scanner (e.g., under a wet condition and/or dry condition), the ultrasonic analysis module may cause the fingerprint scanner to scan the fingerprint of the user to authenticate the user. In some aspects, the fingerprint scanner, as an optical scanner, may scan the finger of the user to obtain an image of a fingerprint of the user. For example, although the user device may be operating under a wet condition, if the user's finger is pressed against the fingerprint scanner, the fingerprint scanner can obtain an image of the fingerprint to enable the fingerprint scanner to authenticate the user (e.g., for an unlock operation and/or a log in operation of the user device).

In this way, the wet condition detection module and/or wet finger detection module may be utilized to detect the presence of a finger of a user over a fingerprint scanner of a user device and correspondingly cause the fingerprint scanner to authenticate the user and/or enable an unlock operation of the user device to be performed when the user device is operating under a wet condition.

As indicated above, FIG. 4 is provided merely as one or more examples. Other examples may differ from what is described with regard to FIG. 4.

Figure 5:
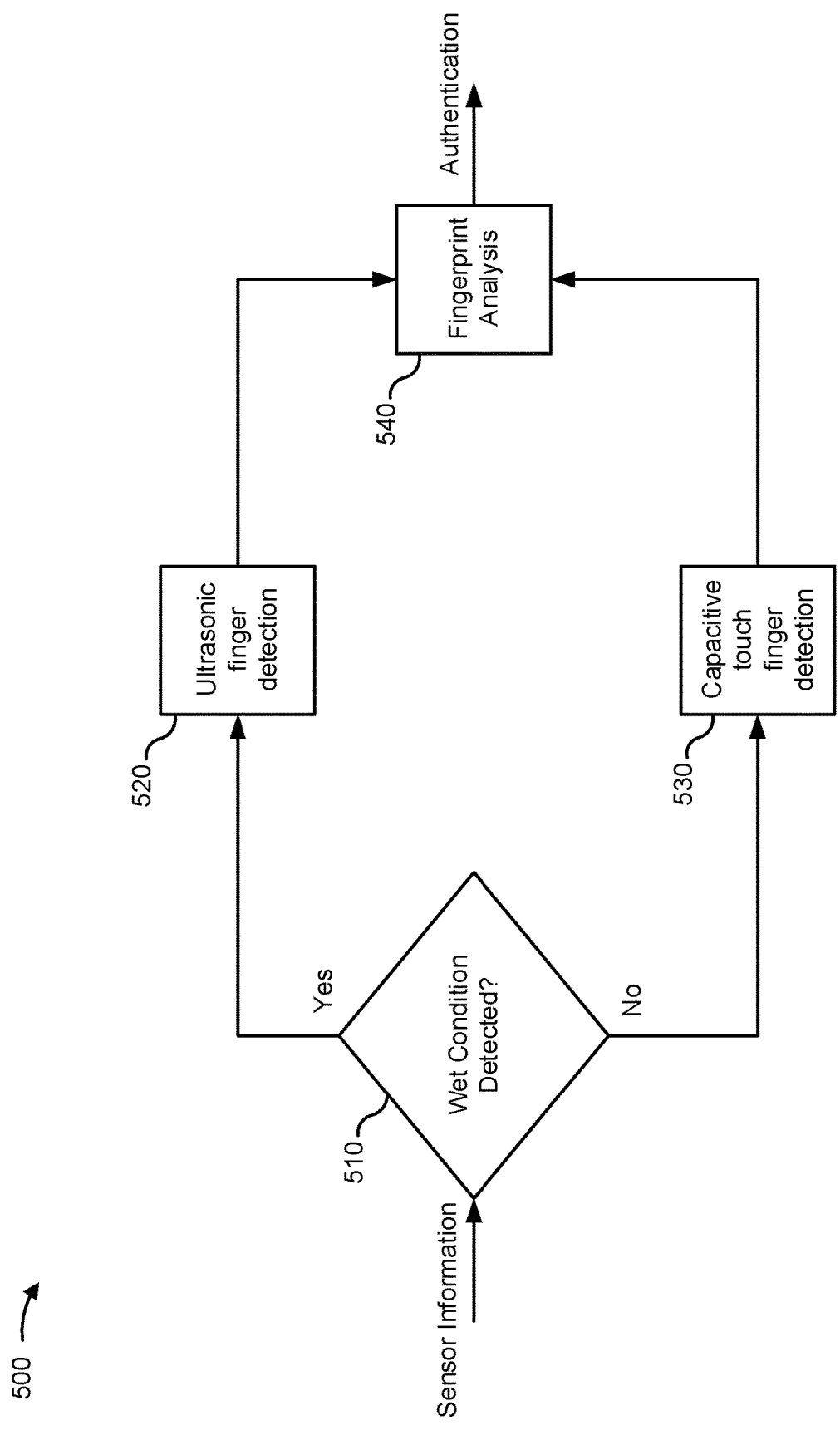

FIG. 5 is a diagram conceptually illustrating an example 500 associated with controlling a user device under wet conditions in accordance with various aspects of the present disclosure. Example 500 may correspond to a process performed by user device 110 and/or user device 302 to detect a finger of user and/or receive a user input from the user. As shown in FIG. 5, finger detection may be performed based at least in part on whether the user device is operating under a wet condition.

As shown by reference number 510, the user device may determine whether a wet condition has been detected (e.g., using wet condition detection module as described in connection with FIG. 4). If the user device determines that the user device detects that the user device is operating under a wet condition, as indicated by reference number 520, the user device may perform ultrasonic finger detection to determine whether a user is interacting with the user device (e.g., detect touching fingerprint scanner 306 using active finger detection, detect tapping on touchscreen 304 using passive finger detection, and/or the like). In this way, the user device may detect a finger of the user and/or a user input under a wet condition.

On the other hand, if the user device does not detect a wet condition (and/or detects a dry condition), as indicated by reference number 530, the user device may perform a capacitive touch finger detection to determine whether a user is interacting with the user device. For example, the capacitive touch finger detection may utilize the capacitive touch sensors of the touchscreen 304 and/or fingerprint scanner 306 to detect a finger of the user. The capacitive touch sensors may utilize and/or require fewer computing resources and/or power resources relative to ultrasonic sensor 314. In this way, the user device may utilize the capacitive touch sensors of the user device as input components to detect a finger in order to conserve power associated with detecting a user under a non-wet condition.

As shown by reference number 540, after a user's finger is detected, the user device may perform a fingerprint analysis to authenticate the user. In this way, a user device may select which input components and/or sensors are to be utilized to detect a finger of a user and/or cause a fingerprint scanner to perform an authentication of the user.

According to some implementations, the user device may select which input components are to be utilized to enable the user to interact with the user device. For example, under a wet condition, the user device may configure one set of input components of a user interface to operate a function of the user device, and under a dry condition, the user device may configure a different set of input components to operate the function of the user device. More specifically, if the user device is determined to be in a wet condition and a camera function of the user device has been selected according to a user input, volume buttons associated with a speaker output of the user device may be utilized to control a zoom feature of the camera function. In contrast, if the user device is determined to not be in a wet condition and the camera function of the user device has been selected, the capacitive touch sensors of the touchscreen may be used to control the zoom feature. Additionally, or alternatively, a same set of input components of the user device may operate differently based at least in part on whether the user device is determined to be operating under a wet condition or a dry condition. For example, the user device may configure the volume buttons to control a camera function and/or flashlight function (e.g., according to a user input selecting the camera function or the flashlight function) of the user device when the user device is operating under water. Further, in such an example, the user device may configure the volume buttons to increase or decrease a speaker volume when the user device is determined to not be operating under a wet condition.

As indicated above, FIG. 5 is provided merely as one or more examples. Other examples may differ from what is described with regard to FIG. 5.

Figure 6:
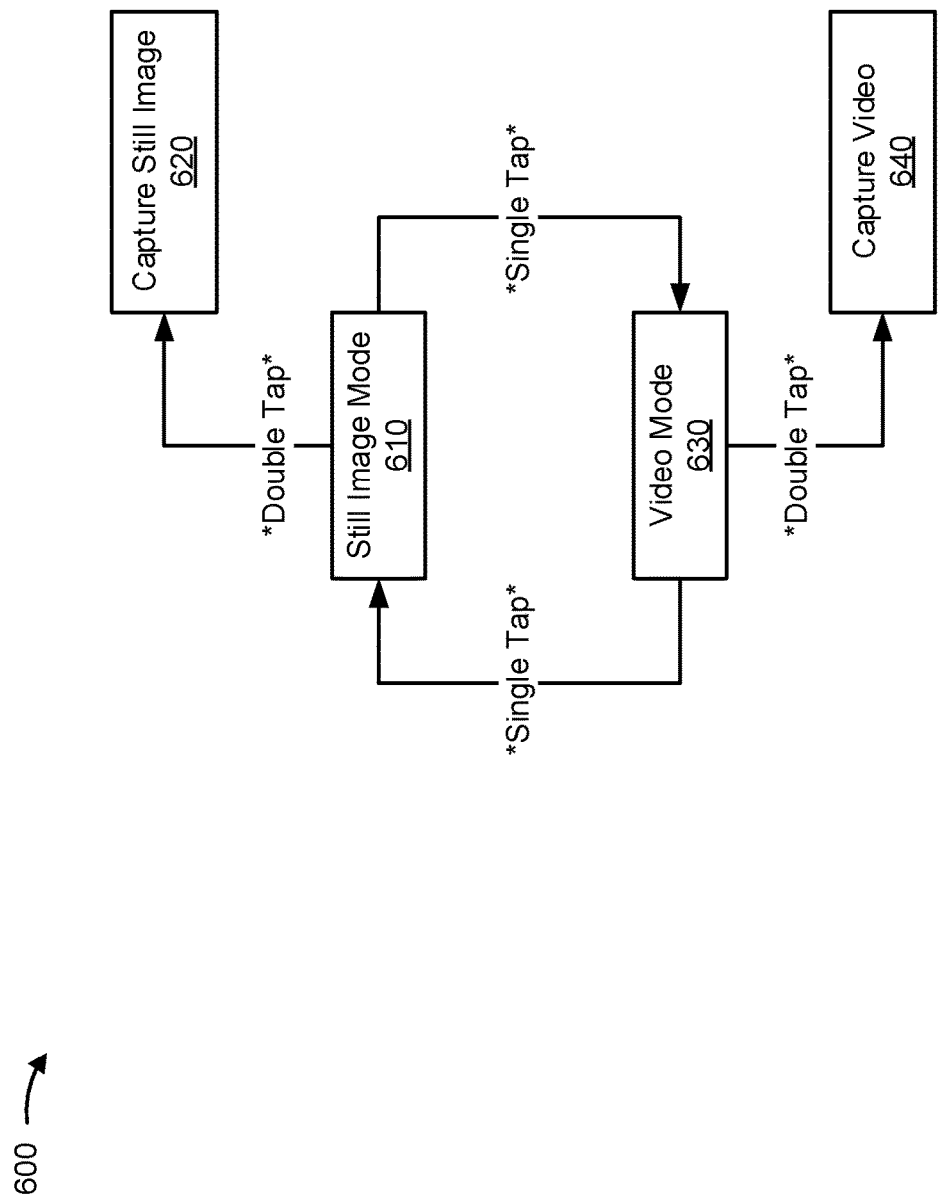

FIG. 6 is a diagram conceptually illustrating an example 600 associated with controlling a user device under wet conditions in accordance with various aspects of the present disclosure. In example 600, a state machine is shown to illustrate how a function of a user device (e.g., user device 110 and/or user device 302) may be controlled using an ultrasonic sensor when the user device is determined to be in a wet condition, as described herein.

As mentioned above, one or more input components of the user device may be configured based at least in part on whether the user device is determined to be operating under a wet condition. In such a case, the input components, which may include sensors, such as piezoelectric element 316, may be configured to detect user inputs according to the condition of the user device. For example, a user input mapping of tap sequences for certain controls and/or commands may be configured to operate and/or control a function of a user device when the user device is in a wet condition.

As an example, the user device may determine that the user device is operating under a wet condition and that a camera function has been activated (e.g., according to a user input and/or tap sequence). In such an example, the user device may use the state machine of example 600 to control the camera function. More specifically, the user device may monitor piezoelectric element 316 to detect vibrations that are indicative of a user tapping (and/or performing a tap sequence corresponding to a user input of the camera function) the user device to control the camera function of the user device. Accordingly, the user may control a camera function of the user device according to tap sequences that are detected by the user device using the ultrasonic sensor.

In example 600, as shown by reference number 610, the camera function may be in a still image mode. When the user device detects (e.g., via piezoelectric element 316) a double tap of the user device from the user (e.g., on the touchscreen and/or other component of the user device), the user device may cause the camera to capture a still image, as shown by reference number 620. Furthermore, if the user device is in still image mode and detects a single tap of the user device from the user, the user device may change an operation of the camera function to video mode, as shown by reference number 630.

When in video mode, if the user device detects a double tap, the user device may cause the camera to capture video, as shown by reference number 640. Further, if the user device detects a single tap, the user device may return the camera function to still image mode. Accordingly, a first tap sequence ("single tap") may be utilized by the user (by tapping the user device) and user device (by detecting vibrations of a single tap sensed by piezoelectric element 316) to control a mode of the camera function and a second tap sequence ("double tap") to control an execution of the camera function. Various other tap sequences may be utilized to control operations of the camera function and/or similar tap sequence may be used to control other functions of the user device.

As indicated above, FIG. 6 is provided merely as one or more examples. Other examples may differ from what is described with regard to FIG. 6.

Figure 7:
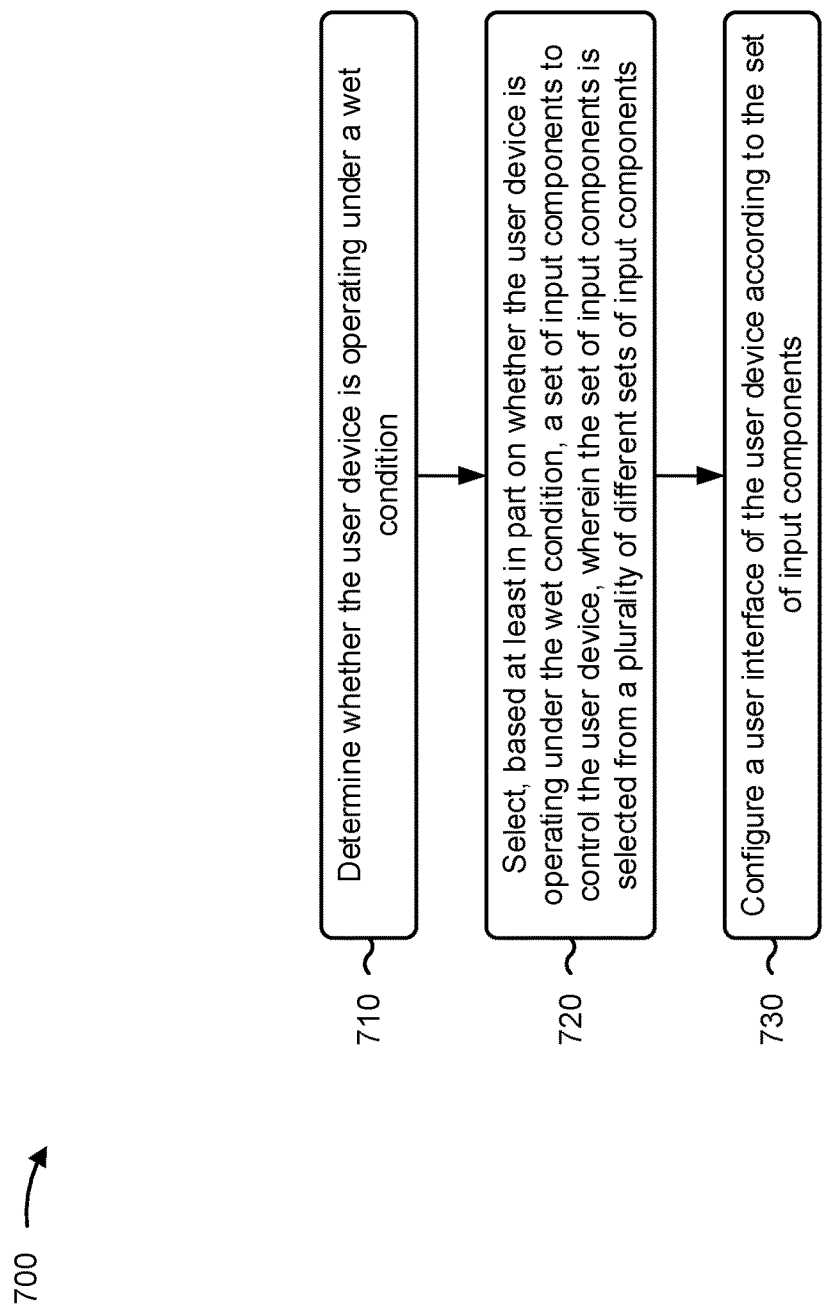
FIGS. 7-10 are diagrams illustrating example processes performed, for example, by a user device, in accordance with various aspects of the present disclosure.

FIG. 7 is a diagram illustrating an example process 700 performed, for example, by a user device, in accordance with various aspects of the present disclosure. Example process 700 is an example where the user device (e.g., user device 110 and/or the like) performs operations associated with control under wet conditions.

As shown in FIG. 7, in some aspects, process 700 may include determining whether the user device is operating under a wet condition (block 710). For example, the user device (e.g., using processor 210, memory 215, storage component 220, input component 225, output component 230, communication interface 235, sensor 240, fingerprint scanner 245, and/or the like) may determine whether the user device is operating under a wet condition, as described above.

As further shown in FIG. 7, in some aspects, process 700 may include selecting, based at least in part on whether the user device is operating under the wet condition, a set of input components to control the user device, wherein the set of input components is selected from a plurality of different sets of input components (block 720). For example, the user device (e.g., using processor 210, memory 215, storage component 220, input component 225, output component 230, communication interface 235, sensor 240, fingerprint scanner 245, and/or the like) may select, based at least in part on whether the user device is operating under the wet condition, a set of input components to control the user device, as described above. In some aspects, the set of input components is selected from a plurality of different sets of input components.

As further shown in FIG. 7, in some aspects, process 700 may include configuring a user interface of the user device according to the set of input components (block 730). For example, the user device (e.g., using processor 210, memory 215, storage component 220, input component 225, output component 230, communication interface 235, sensor 240, fingerprint scanner 245, and/or the like) may configure a user interface of the user device according to the set of input components, as described above.

Process 700 may include additional aspects, such as any single aspect or any combination of aspects described below and/or in connection with one or more other processes described elsewhere herein.

In a first aspect, the user device is determined to be operating under the wet condition based at least in part on: receiving, from a hydrometer of the user device, a liquid measurement indicating that the user device is operating under the wet condition.

In a second aspect, alone or in combination with the first aspect, the user device is determined to be operating under the wet condition based at least in part on: determining that a capacitive measurement of a touchscreen of the user interface satisfies a threshold measurement associated with the user device being in a wet condition.

In a third aspect, alone or in combination with one or more of the first and second aspects, selecting the set of input components comprises: selecting, when the user device is determined to be operating under the wet condition, a first set of input components of the user interface, wherein the user interface is configured to control the user device using first information from the first set of components, or selecting, when the user device is determined to not be operating under the wet condition, a second set of input components of the user interface that is different from the first set of input components, wherein the user interface is configured to control the user device using second information from the second set of components.

In a fourth aspect, alone or in combination with one or more of the first through third aspects, the first set of input components includes an ultrasonic sensor to detect a user of the user device, and the second set of input components include a capacitive touch sensor of a touchscreen of the user interface, and does not include the ultrasonic sensor, to detect a user of the user device.

In a fifth aspect, alone or in combination with one or more of the first through fourth aspects, the user is detected based at least in part on at least one of: a passive acoustic measurement associated with a piezoelectric property of the ultrasonic sensor, or an active ultrasonic measurement associated with an ultrasonic signal transmitted by the ultrasonic sensor and a reflected ultrasonic signal received by the ultrasonic sensor.

In a sixth aspect, alone or in combination with one or more of the first through fifth aspects, when the user device is determined to be operating under the wet condition, the set of input components is selected to include an ultrasonic sensor and process 700 may include configuring the user interface to enable selection and/or control of a function of the user device using passive acoustic measurements of the ultrasonic sensor.

In a seventh aspect, alone or in combination with one or more of the first through sixth aspects, configuring the user interface to enable the selection and/or the control of the function comprises: configuring the selection and/or control of the function according to reference touch sequences in a function mapping corresponding to the function, wherein the reference touch sequences are maintained in a data structure of the user device; and activating control of the function using the passive acoustic measurements from the ultrasonic sensor and the function mapping.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
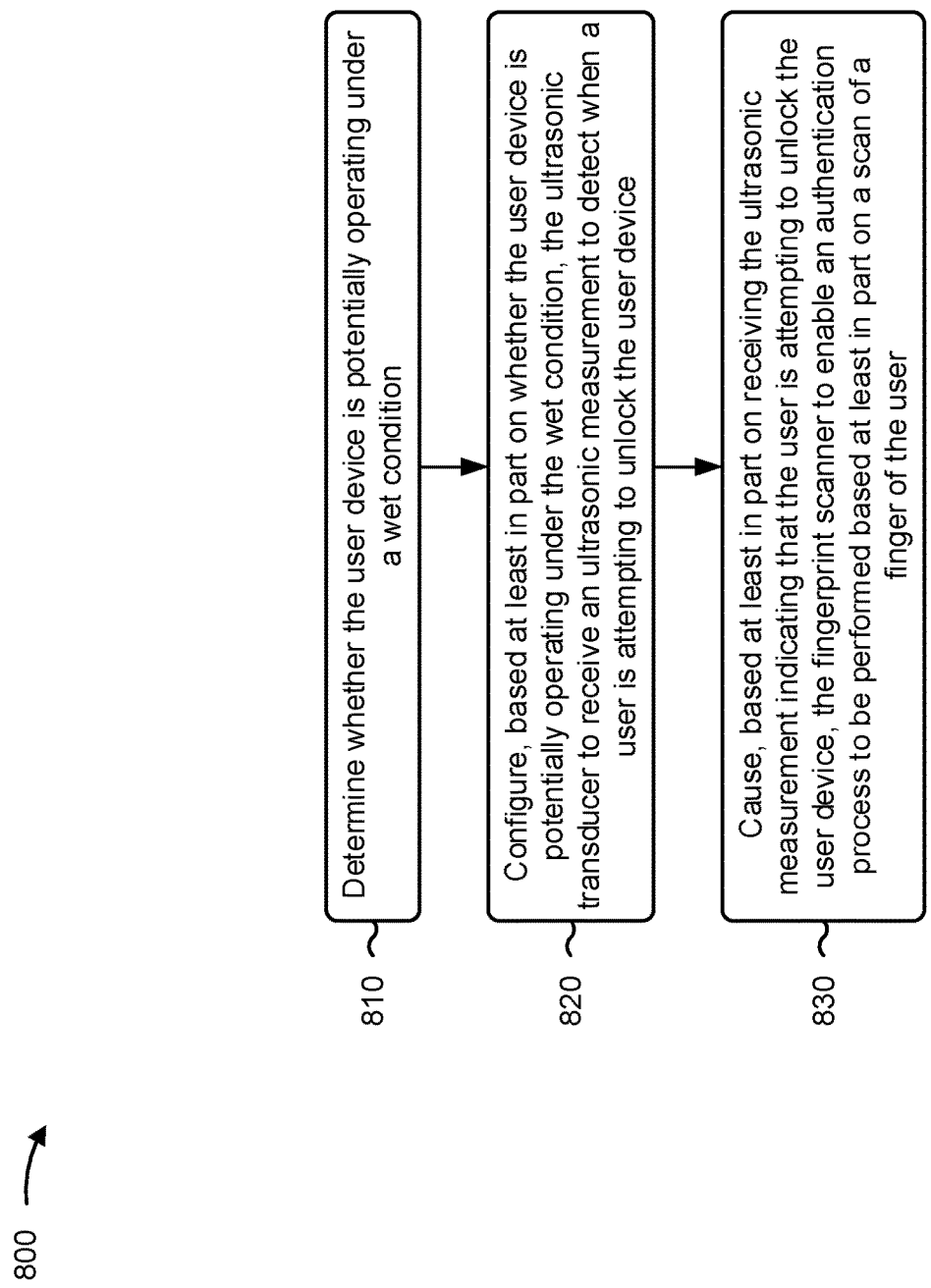

FIG. 8 is a diagram illustrating an example process 800 performed, for example, by a user device, in accordance with various aspects of the present disclosure. Example process 800 is an example where the user device (e.g., user device 110 and/or the like) performs operations associated with control under wet conditions.

As shown in FIG. 8, in some aspects, process 800 may include determining whether a user device is potentially operating under a wet condition (block 810). For example, the user device (e.g., using processor 210, memory 215, storage component 220, input component 225, output component 230, communication interface 235, sensor 240, fingerprint scanner 245, and/or the like) may determine whether a user device is potentially operating under a wet condition, as described above.

As further shown in FIG. 8, in some aspects, process 800 may include configuring, based at least in part on whether the user device is potentially operating under the wet condition, an ultrasonic sensor to receive an ultrasonic measurement to detect when a user is attempting to unlock the user device (block 820). For example, the user device (e.g., using processor 210, memory 215, storage component 220, input component 225, output component 230, communication interface 235, sensor 240, fingerprint scanner 245, and/or the like) may configure, based at least in part on whether the user device is potentially operating under the wet condition, an ultrasonic sensor to receive an ultrasonic measurement to detect when a user is attempting to unlock the user device, as described above.

As further shown in FIG. 8, in some aspects, process 800 may include causing, based at least in part on receiving the ultrasonic measurement indicating that the user is attempting to unlock the user device, the fingerprint scanner to enable an authentication process to be performed based at least in part on a scan of a finger of the user (block 830). For example, the user device (e.g., using processor 210, memory 215, storage component 220, input component 225, output component 230, communication interface 235, sensor 240, fingerprint scanner 245, and/or the like) may cause, based at least in part on receiving the ultrasonic measurement indicating that the user is attempting to unlock the user device, the fingerprint scanner to enable an authentication process to be performed based at least in part on a scan of a finger of the user, as described above.

Process 800 may include additional aspects, such as any single aspect or any combination of aspects described below and/or in connection with one or more other processes described elsewhere herein.

In a first aspect, the ultrasonic measurement corresponds to, based at least in part on whether the user device is potentially operating under the wet condition, at least one of: a passive acoustic measurement associated with a piezoelectric property of the ultrasonic sensor, or an active ultrasonic measurement associated with an ultrasonic signal by the ultrasonic sensor and a reflected ultrasonic signal received by the ultrasonic sensor.

In a second aspect, alone or in combination with the first aspect, the ultrasonic measurement corresponds to a passive acoustic measurement associated with a piezoelectric property of the ultrasonic sensor and process 800 may include causing, based at least in part on the passive acoustic measurement satisfying a threshold, the ultrasonic sensor to provide an active ultrasonic measurement associated with locating the user relative to the fingerprint scanner, and the active ultrasonic measurement is associated with a transmitted ultrasonic signal of the ultrasonic sensor and a reflected ultrasonic signal received by the ultrasonic sensor.

In a third aspect, alone or in combination with one or more of the first and second aspects, the ultrasonic sensor and the fingerprint scanner include a same set of sensing elements that are configured to: receive reflected ultrasonic signals to determine a presence or absence of the finger of the user relative to the set of sensing elements, wherein the reflected ultrasonic signals are associated with an ultrasonic signal transmitted by the ultrasonic sensor; and scan, using the set of sensing elements associated with the presence of the finger, the finger to obtain a biometric measurement of a fingerprint of the finger.

In a fourth aspect, alone or in combination with one or more of the first through third aspects, process 800 includes receiving the ultrasonic measurement; and determining that the ultrasonic measurement is associated with the user attempting to unlock the user device based at least in part on the ultrasonic measurement including a passive acoustic measurement of the ultrasonic sensor that is representative of the user pressing the finger of the user against a capacitive sensor associated with the fingerprint scanner.

In a fifth aspect, alone or in combination with one or more of the first through fourth aspects, process 800 includes determining that the ultrasonic measurement is received under a wet condition, wherein the fingerprint scanner is being configured to perform the authentication process to permit an unlock operation of the user device to be performed under the wet condition.

In a sixth aspect, alone or in combination with one or more of the first through fifth aspects, when determining whether the user device is potentially operating under the wet condition, process 800 includes determining whether the user device is operating under a wet condition based at least in part on at least one of: a hydrometer measurement, a capacitive measurement is associating with the fingerprint scanner, or an operating condition of the user device.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
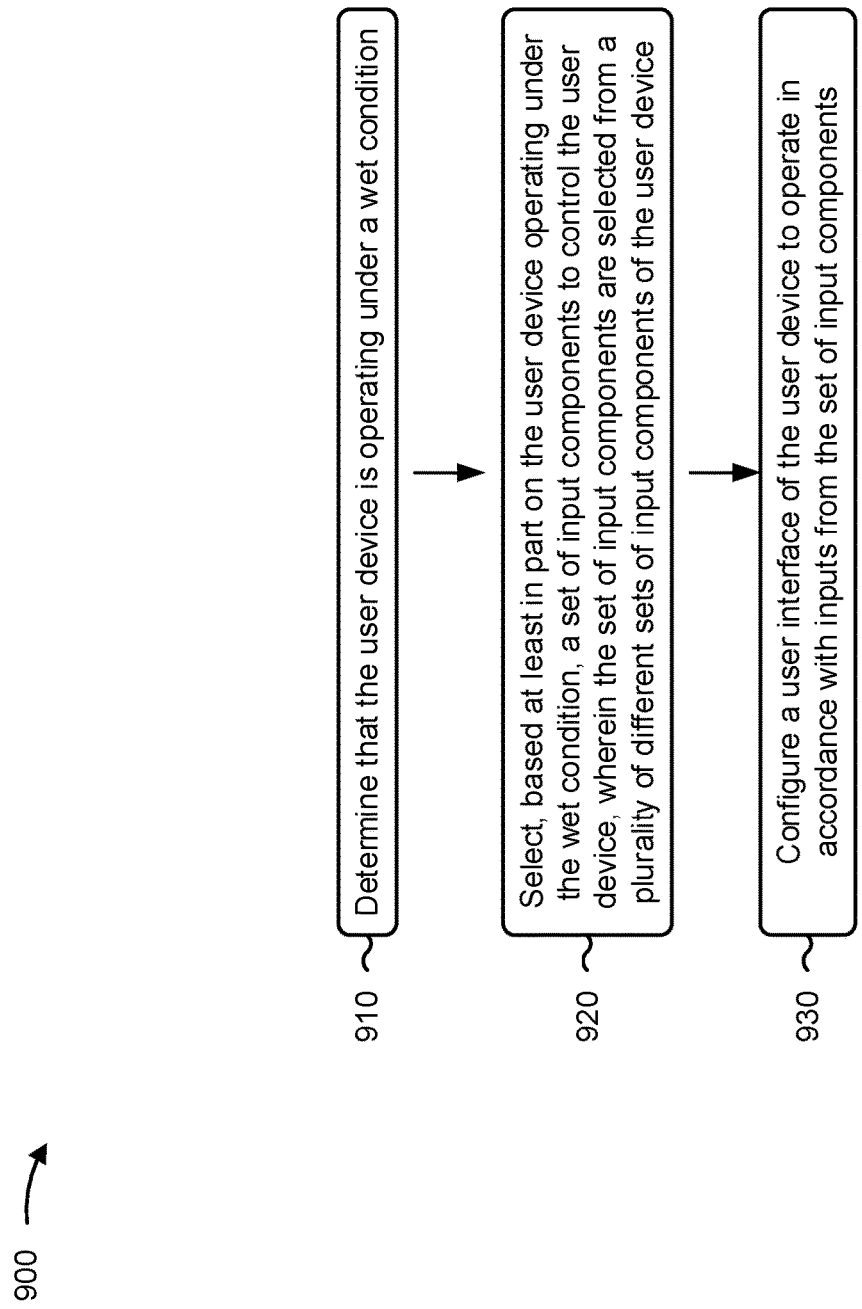

FIG. 9 is a diagram illustrating an example process 900 performed, for example, by a user device, in accordance with various aspects of the present disclosure. Example process 900 is an example where the user device (e.g., user device 110 and/or the like) performs operations associated with control under wet conditions.

As shown in FIG. 9, in some aspects, process 900 may include determining that the user device is operating under a wet condition (block 910). For example, the user device (e.g., using processor 210, memory 215, storage component 220, input component 225, output component 230, communication interface 235, sensor 240, fingerprint scanner 245, and/or the like) may determine that the user device is operating under a wet condition, as described above.

As further shown in FIG. 9, in some aspects, process 900 may include selecting, based at least in part on the user device operating under the wet condition, a set of input components to control the user device, wherein the set of input components are selected from a plurality of different sets of input components of the user device (block 920). For example, the user device (e.g., using processor 210, memory 215, storage component 220, input component 225, output component 230, communication interface 235, sensor 240, fingerprint scanner 245, and/or the like) may select, based at least in part on the user device operating under the wet condition, a set of input components to control the user device, as described above. In some aspects, the set of input components are selected from a plurality of different sets of input components of the user device.

As further shown in FIG. 9, in some aspects, process 900 may include configuring a user interface of the user device to operate in accordance with inputs from the set of input components (block 930). For example, the user device (e.g., using processor 210, memory 215, storage component 220, input component 225, output component 230, communication interface 235, sensor 240, fingerprint scanner 245, and/or the like) may configure a user interface of the user device to operate in accordance with inputs from the set of input components, as described above.

Process 900 may include additional aspects, such as any single aspect or any combination of aspects described below and/or in connection with one or more other processes described elsewhere herein.

In a first aspect, process 900 includes receiving, from a hydrometer of the user device, a water measurement, wherein the user device is being determined to be operating under the wet condition based at least in part on the water measurement indicating that the user device is operating under the wet condition.

In a second aspect, alone or in combination with the first aspect, the wet condition corresponds to the user device being underwater when the water measurement satisfies an underwater threshold measurement.

In a third aspect, alone or in combination with one or more of the first and second aspects, process 900 includes receiving, from a capacitive touch sensor of the user device, a capacitive measurement that is outside of a threshold range of a baseline measurement of the capacitive touch sensor, wherein the user device is being determined to be operating under the wet condition based at least in part on the capacitive measurement being outside of the threshold range of the baseline measurement.

In a fourth aspect, alone or in combination with one or more of the first through third aspects, the wet condition corresponds to the capacitive touch sensor being wet when the capacitive measurement is outside of the threshold range of the baseline measurement.

In a fifth aspect, alone or in combination with one or more of the first through fourth aspects, process 900 includes selecting the set of input components to include an ultrasonic sensor for use during an unlock operation of the user device to permit the user device to be unlocked when operating under the wet condition.

In a sixth aspect, alone or in combination with one or more of the first through fifth aspects, process 900 includes selecting the set of input components to include an ultrasonic sensor for use during a user session of the user device to permit a function of the user device to be controlled according to passive acoustic measurements of the ultrasonic sensor or active ultrasonic measurements of the ultrasonic sensor.

In a seventh aspect, alone or in combination with one or more of the first through sixth aspects, process 900 includes configuring control of the function according to reference touch sequences in a function mapping corresponding to the function, wherein the reference is touching sequences are maintained in a data structure of the user device and are associated with individual operations of the function; and causing the user device to perform an operation of the function when received passive acoustic measurements of the ultrasonic sensor correspond to a reference touch sequence associated with the operation.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
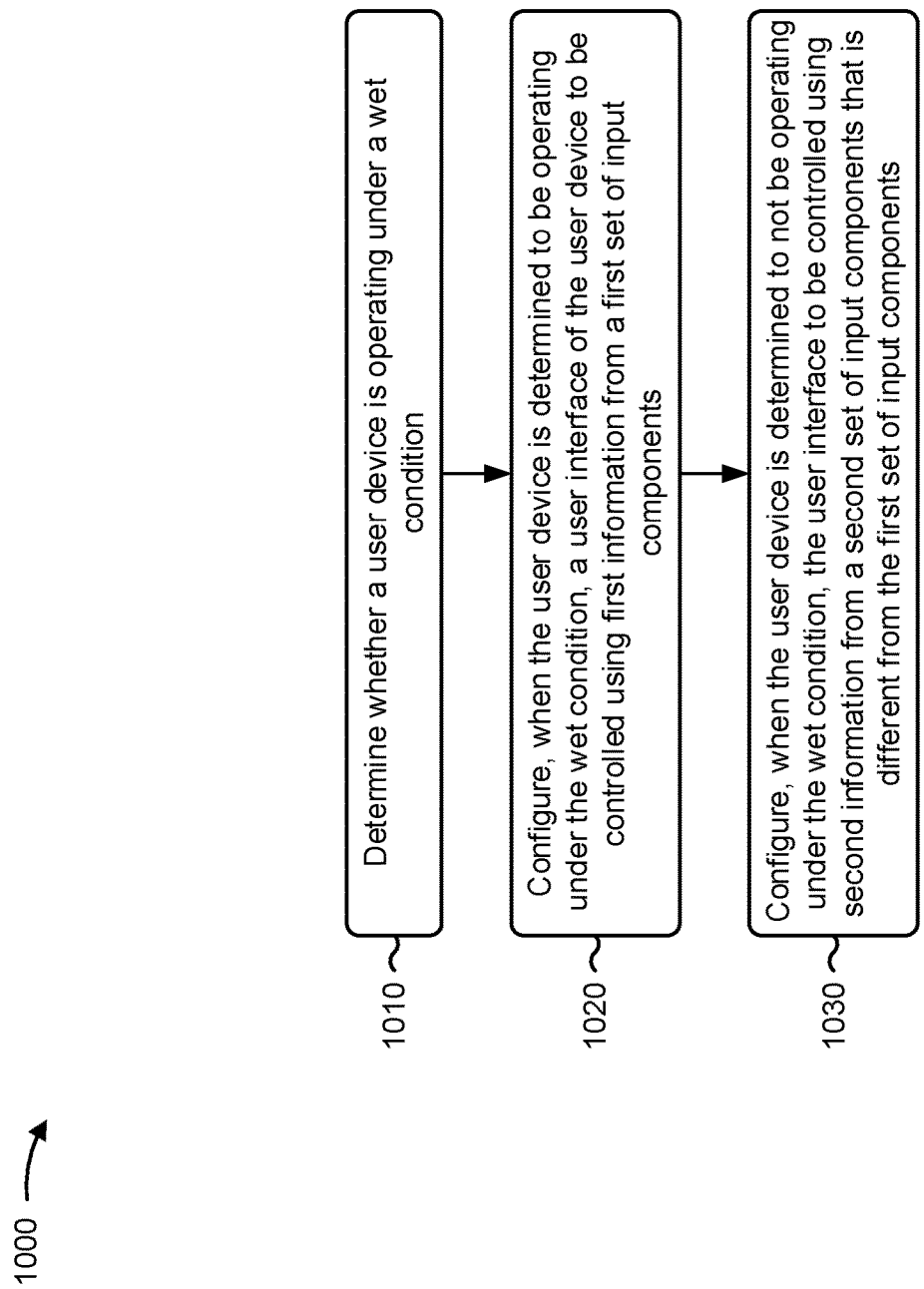

FIG. 10 is a diagram illustrating an example process 1000 performed, for example, by a user device, in accordance with various aspects of the present disclosure. Example process 1000 is an example where the user device (e.g., user device 110 and/or the like) performs operations associated with control under wet conditions.

As shown in FIG. 10, in some aspects, process 1000 may include meaning for determining whether a user device is operating under a wet condition (block 1010). For example, the user device (e.g., using processor 210, memory 215, storage component 220, input component 225, output component 230, communication interface 235, sensor 240, fingerprint scanner 245, and/or the like) may means for determining whether a user device is operating under a wet condition, as described above.

As further shown in FIG. 10, in some aspects, process 1000 may include meaning for configuring, when the user device is determined to be operating under the wet condition, a user interface of the user device to be controlled using first information from a first set of input components (block 1020). For example, the user device (e.g., using processor 210, memory 215, storage component 220, input component 225, output component 230, communication interface 235, sensor 240, fingerprint scanner 245, and/or the like) may means for configuring, when the user device is determined to be operating under the wet condition, a user interface of the user device to be controlled using first information from a first set of input components, as described above.

As further shown in FIG. 10, in some aspects, process 1000 may include meaning for configuring, when the user device is determined to not be operating under the wet condition, the user interface to be controlled using second information from a second set of input components that is different from the first set of input components (block 1030). For example, the user device (e.g., using processor 210, memory 215, storage component 220, input component 225, output component 230, communication interface 235, sensor 240, fingerprint scanner 245, and/or the like) may means for configuring, when the user device is determined to not be operating under the wet condition, the user interface to be controlled using second information from a second set of input components that is different from the first set of input components, as described above.

Process 1000 may include additional aspects, such as any single aspect or any combination of aspects described below and/or in connection with one or more other processes described elsewhere herein.

In a first aspect, the user device is determined to be operating under the wet condition based at least in part on: receiving, from a hydrometer of the user device, a liquid measurement indicating that the user device is operating under the wet condition.

In a second aspect, alone or in combination with the first aspect, the user device is determined to be operating under the wet condition based at least in part on: determining that a capacitive measurement of a touchscreen of the user interface satisfies a baseline measurement associated with the user device being in a wet condition.

In a third aspect, alone or in combination with one or more of the first and second aspects, the first set of input components includes an ultrasonic sensor for use in determining that a user is attempting to perform an unlock operation of the user device and the second set of input components includes a capacitive touch sensor for use in determining that a user is attempting to perform an unlock operation of the user device.

In a fourth aspect, alone or in combination with one or more of the first through third aspects, the first set of input components includes an ultrasonic sensor to provide passive acoustic measurements associated with selection and/or control of a function of the user device, and the second set of input components do not include the ultrasonic sensor for selection and/or control of the function of the user device.

In a fifth aspect, alone or in combination with one or more of the first through fourth aspects, when the user device is determined to be operating under the wet condition, the passive acoustic measurements are compared with reference touch sequences associated with controlling the function of the user device, the reference touch sequences are stored in a function mapping in a data structure of the user device, and process 1000 includes controlling the function according to the passive acoustic measurements and the function mapping.

In a sixth aspect, alone or in combination with one or more of the first through fifth aspects, a subset of input components is included within the first set of input components and the second set of input components, and process 1000 includes configuring, when the user device is determined to be operating under the wet condition, the subset of input components to control a first function of the user device, and configuring, when the user device is determined to not be operating under the wet condition, the subset of input components to control a second function of the user device that is different from the first function.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based at least in part on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
    determining, by a user device, that the user device is operating under a wet condition;
    selecting, by the user device and based at least in part on determining that the user device is operating under the wet condition, a set of input components of a user interface of the user device,
        wherein the set of input components includes an ultrasonic sensor; and
    configuring, by the user device, selection and/or control of a camera function of the user device using passive acoustic measurements of the ultrasonic sensor and different reference touch sequences in a function mapping corresponding to a plurality of controls or commands of the camera function.

2. The method of claim 1, wherein the user device is determined to be operating under the wet condition based at least in part on:
    receiving, from a hydrometer of the user device, a liquid measurement indicating that the user device is operating under the wet condition.

3. The method of claim 1, wherein the user device is determined to be operating under the wet condition based at least in part on:
    determining that a capacitive measurement of a touchscreen of the user interface satisfies a threshold measurement associated with the user device operating under the wet condition.

4. The method of claim 1, wherein the set of input components are different from a different set of input components that is selected when the user device is determined to not be operating under the wet condition.

5. The method of claim 4, wherein the different set of input components includes a capacitive touch sensor of a touchscreen of the user interface, and does not include the ultrasonic sensor, to detect a user of the user device.

6. The method of claim 1, further comprising:
    detecting a user, of the user device, based at least in part on at least one of:
        a passive acoustic measurement, of the passive acoustic measurements, associated with a piezoelectric property of the ultrasonic sensor, or
        an active ultrasonic measurement associated with an ultrasonic signal transmitted by the ultrasonic sensor and a reflected ultrasonic signal received by the ultrasonic sensor.

7. The method of claim 1,
    wherein the different reference touch sequences are maintained in a data structure of the user device, and
    wherein configuring the selection and/or the control of the camera function comprises:
        activating the control of the camera function using the passive acoustic measurements of the ultrasonic sensor and the different reference touch sequences in the function mapping.

8. A user device, comprising:
    a user interface that includes an ultrasonic sensor;
    one or more memories; and
    one or more processors configured to:
        determine that the user device is operating under a wet condition;
        configure, based at least in part on the user device operating under the wet condition, the ultrasonic sensor to receive a passive acoustic measurement; and
        cause, based at least in part on the passive acoustic measurement corresponding to one or more reference touch sequences, a fingerprint scanner to enable an authentication process,
            wherein the passive acoustic measurement is representative of a user pressing a finger of the user against a capacitive sensor layer associated with the fingerprint scanner.

9. The user device of claim 8, wherein the passive acoustic measurement is associated with a piezoelectric property of the ultrasonic sensor.

10. The user device of claim 8,
    wherein the one or more processors are configured to:
        cause, based at least in part on the passive acoustic measurement satisfying a threshold, the ultrasonic sensor to provide an active ultrasonic measurement associated with locating a user relative to the fingerprint scanner,
wherein the active ultrasonic measurement is associated with a transmitted ultrasonic signal of the ultrasonic sensor and a reflected ultrasonic signal received by the ultrasonic sensor.

11. The user device of claim 8,
wherein the user device includes the fingerprint scanner, and
wherein the ultrasonic sensor and the fingerprint scanner include a same set of sensing elements that are configured to:
receive reflected ultrasonic signals to determine a presence or absence of the finger relative to the same set of sensing elements,
wherein the reflected ultrasonic signals are associated with an ultrasonic signal transmitted by the ultrasonic sensor; and
scan, using the same set of sensing elements associated with the presence of the finger, the finger to obtain a biometric measurement of a fingerprint of the finger.

12. The user device of claim 8,
wherein the fingerprint scanner is configured to perform the authentication process to permit an unlock operation of the user device to be performed under the wet condition.

13. The user device of claim 8, wherein the one or more processors, when determining that the user device is operating under the wet condition, are configured to:
determine that the user device is operating under the wet condition based at least in part on at least one of:
a hydrometer measurement,
a capacitive measurement, or
an operating condition of the user device.

14. The user device of claim 8, wherein the one or more processors are further configured to:
select, based at least in part on the user device operating under the wet condition, a set of input components, from a plurality of different sets of input components, that includes the ultrasonic sensor,
the plurality of different sets of input components further including a different set of input components that is selected when the user device is not potentially operating under the wet condition.

15. A non-transitory computer-readable medium storing instructions, the instructions comprising:
one or more instructions that, when executed by one or more processors of a user device, cause the one or more processors to:
determine that the user device is operating under a wet condition;
select, based at least in part on the user device operating under the wet condition, a set of input components of a user interface of the user device,
wherein the set of input components includes an ultrasonic sensor; and
configure selection and/or control of a camera function of the user device using one or more passive acoustic measurements of the ultrasonic sensor and different reference touch sequences in a function mapping corresponding to a plurality of controls or commands of the camera function.

16. The non-transitory computer-readable medium of claim 14, wherein the one or more instructions, when executed by the one or more processors, cause the one or more processors to:
receive, from a hydrometer of the user device, a water measurement,
wherein the user device is determined to be operating under the wet condition based at least in part on the water measurement indicating that the user device is operating under the wet condition.

17. The non-transitory computer-readable medium of claim 16, wherein the wet condition corresponds to the user device being underwater when the water measurement satisfies an underwater threshold measurement.

18. The non-transitory computer-readable medium of claim 15, wherein the one or more instructions, when executed by the one or more processors, cause the one or more processors to:
receive, from a capacitive touch sensor of the user device, a capacitive measurement that is outside of a threshold range of a baseline measurement of the capacitive touch sensor,
wherein the user device is determined to be operating under the wet condition based at least in part on the capacitive measurement being outside of the threshold range of the baseline measurement.

19. The non-transitory computer-readable medium of claim 18, wherein the wet condition corresponds to the capacitive touch sensor being wet when the capacitive measurement is outside of the threshold range of the baseline measurement.

20. The non-transitory computer-readable medium of claim 15, wherein the one or more instructions further cause the one or more processors to:
control the camera function of the user device according to the one or more passive acoustic measurements.

21. The non-transitory computer-readable medium of claim 15, wherein the different reference touch sequences are maintained in a data structure of the user device and are associated with individual operations of the camera function.

22. A user device, comprising:
memory; and
one or more processors configured to:
determine that the user device is operating under a wet condition;
select, based at least in part on determining that the user device is operating under the wet condition, a set of input components of a user interface of the user device,
wherein the set of input components includes an ultrasonic sensor;
and
configure selection and/or control of a camera function of the user device using passive acoustic measurements of the ultrasonic sensor and different reference touch sequences in a function mapping corresponding to a plurality of controls or commands of the camera function.

23. The user device of claim 22, wherein the user device is determined to be operating under the wet condition based at least in part on a liquid measurement, from a hydrometer of the user device, indicating that the user device is operating under the wet condition.

24. The user device of claim 22, wherein the user device is determined to be operating under the wet condition based at least in part on a capacitive measurement of a touchscreen of the user interface satisfying a baseline measurement associated with the user device operating under the wet condition.

25. The user device of claim 22,
wherein the different reference touch sequences are stored in a data structure of the user device, and
wherein the one or processors are further configured to:
control the camera function according to the one or more passive acoustic measurements and the different reference touch sequences.

26. The user device of claim 22, wherein the set of input components are different from a different set of input components that is selected when the user device is determined to not be operating under the wet condition.

27. The user device of claim 26, wherein the different set of input components includes a capacitive touch sensor of a touchscreen of the user interface, and does not include the ultrasonic sensor, to detect a user of the user device.

28. The user device of claim 22,
wherein the different reference touch sequences include a double tap of the user device,
wherein the one or more processors are further configured to:
detect the double tap of the user device, and
cause a camera to capture a still image based on detecting the double tap of the user device.

29. The user device of claim 22,
wherein the different reference touch sequences include a single tap of the user device,
wherein the one or more processors are further configured to:
detect the single tap of the user device, and
change an operation of the camera function to a video mode based on detecting the single tap of the user device.

30. The user device of claim 22, wherein the different reference touch sequences include:
a first tap sequence to control a mode of the camera function, and
a second tap sequence to control an execution of the camera function.

* * * * *